United States Patent [19]

Snyder

[11] 4,186,766
[45] Feb. 5, 1980

[54] FLOW LINE CONTROL SYSTEM

[75] Inventor: David E. Snyder, Longview, Tex.

[73] Assignee: U.S. Industries, Inc., New York, N.Y.

[21] Appl. No.: 853,513

[22] Filed: Nov. 21, 1977

[51] Int. Cl.² .............................................. F16K 17/00
[52] U.S. Cl. .................................. 137/458; 137/492.5
[58] Field of Search ............. 137/458, 488, 492, 492.5

[56] References Cited

U.S. PATENT DOCUMENTS

| 3,232,174 | 2/1966 | Grimmer | 137/458 X |
|---|---|---|---|
| 3,389,718 | 6/1968 | Johnson | 137/492.5 |
| 3,920,040 | 11/1975 | Powell | 137/458 |
| 3,991,784 | 11/1976 | Gano | 137/458 |

Primary Examiner—Alan Cohan

[57] ABSTRACT

There is disclosed a system wherein a valve in a line is moved between flow controlling positions by means of a fluid-operated actuator. The admission and exhaustion of line fluid to and from the actuator is controlled by sensors which are automatically responsive to predetermined high and low pressures of the line fluid.

9 Claims, 18 Drawing Figures

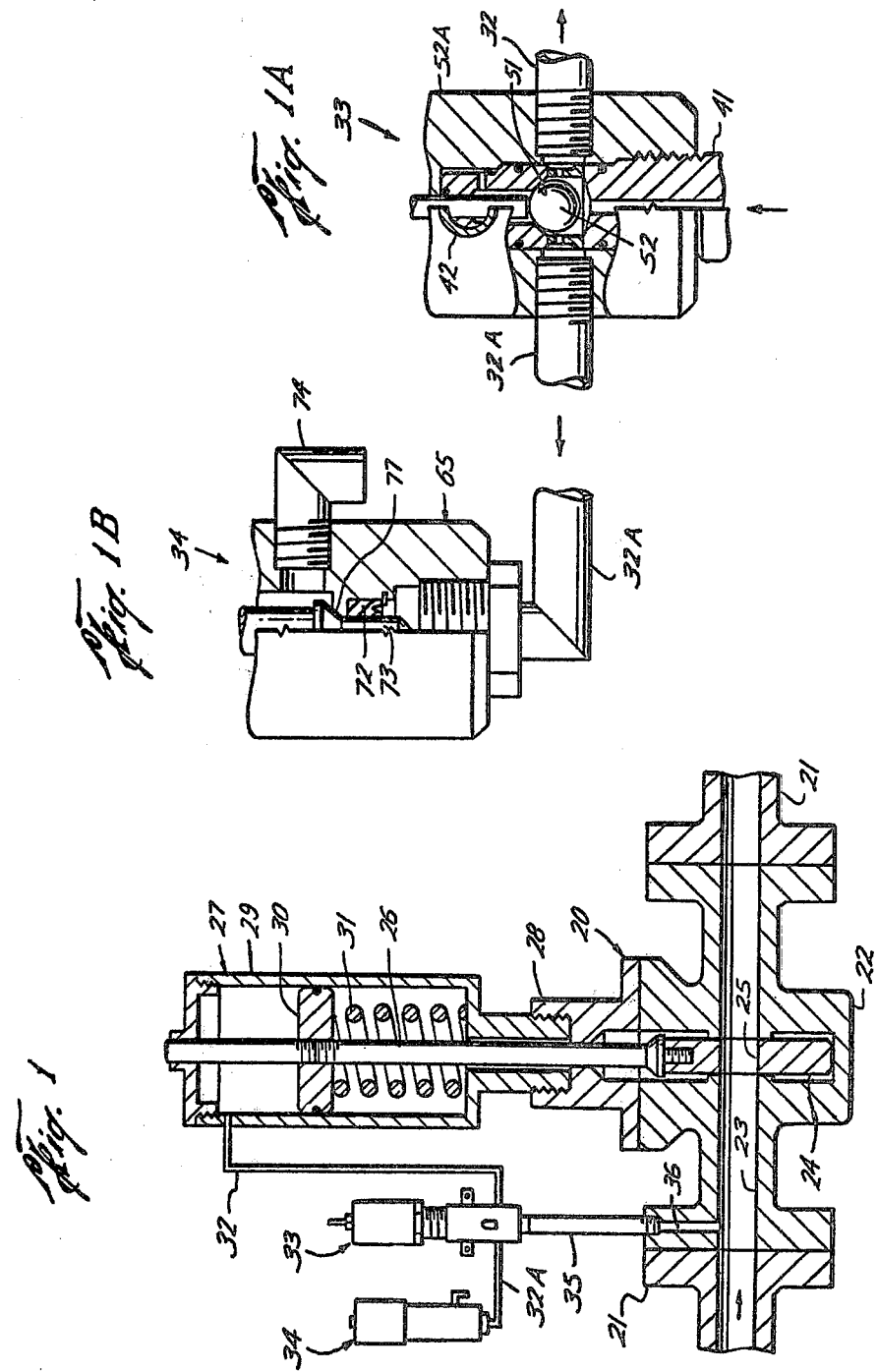

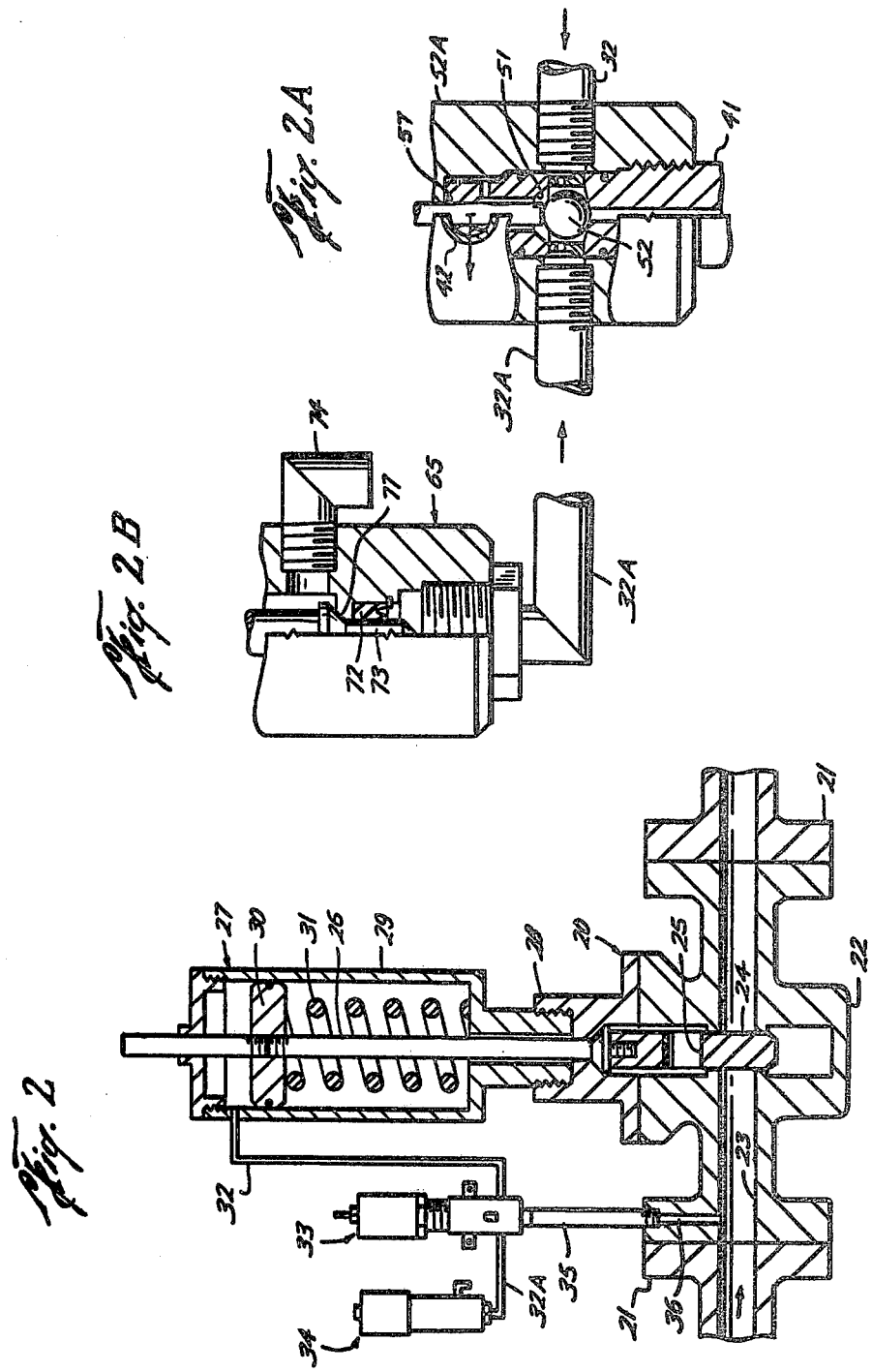

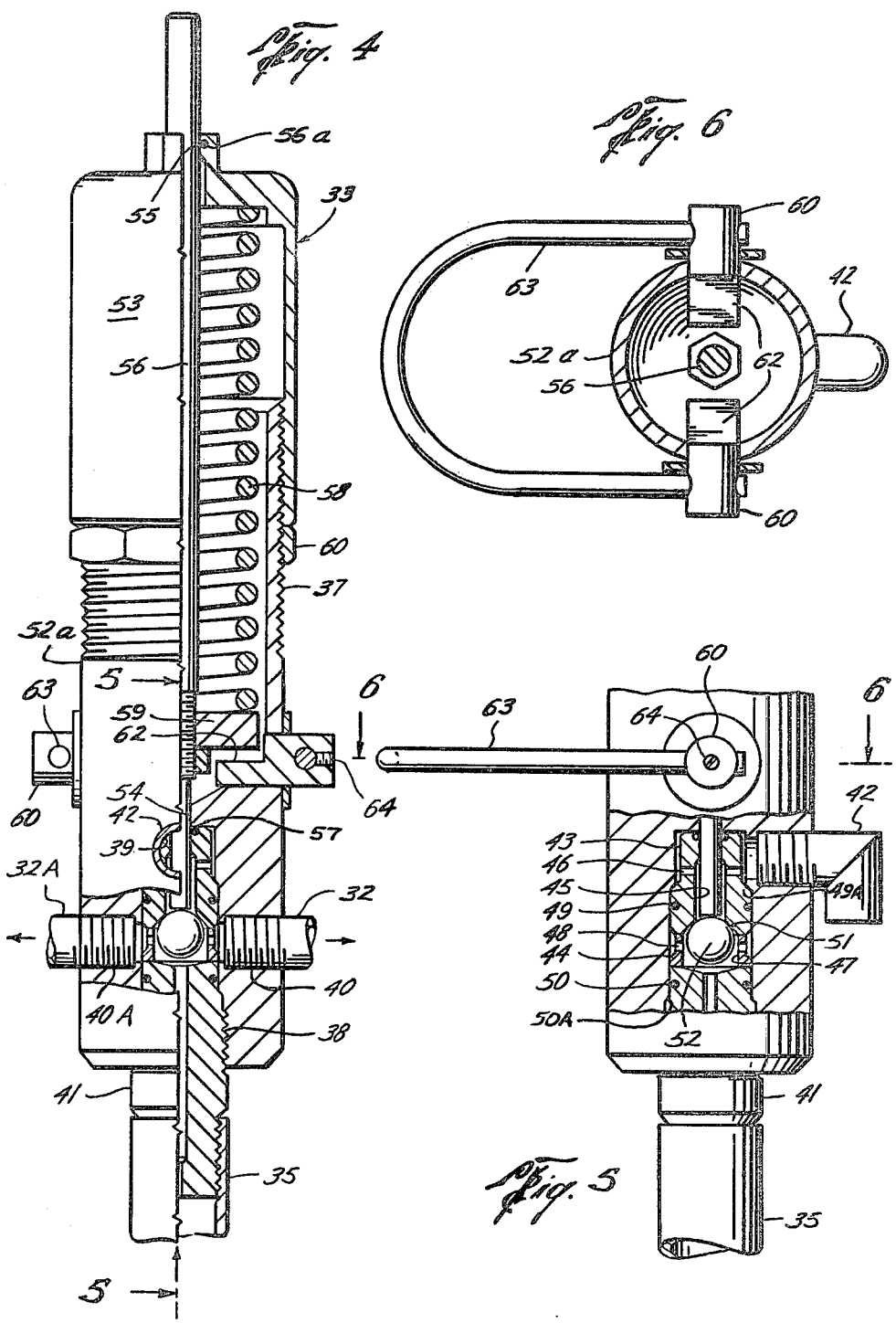

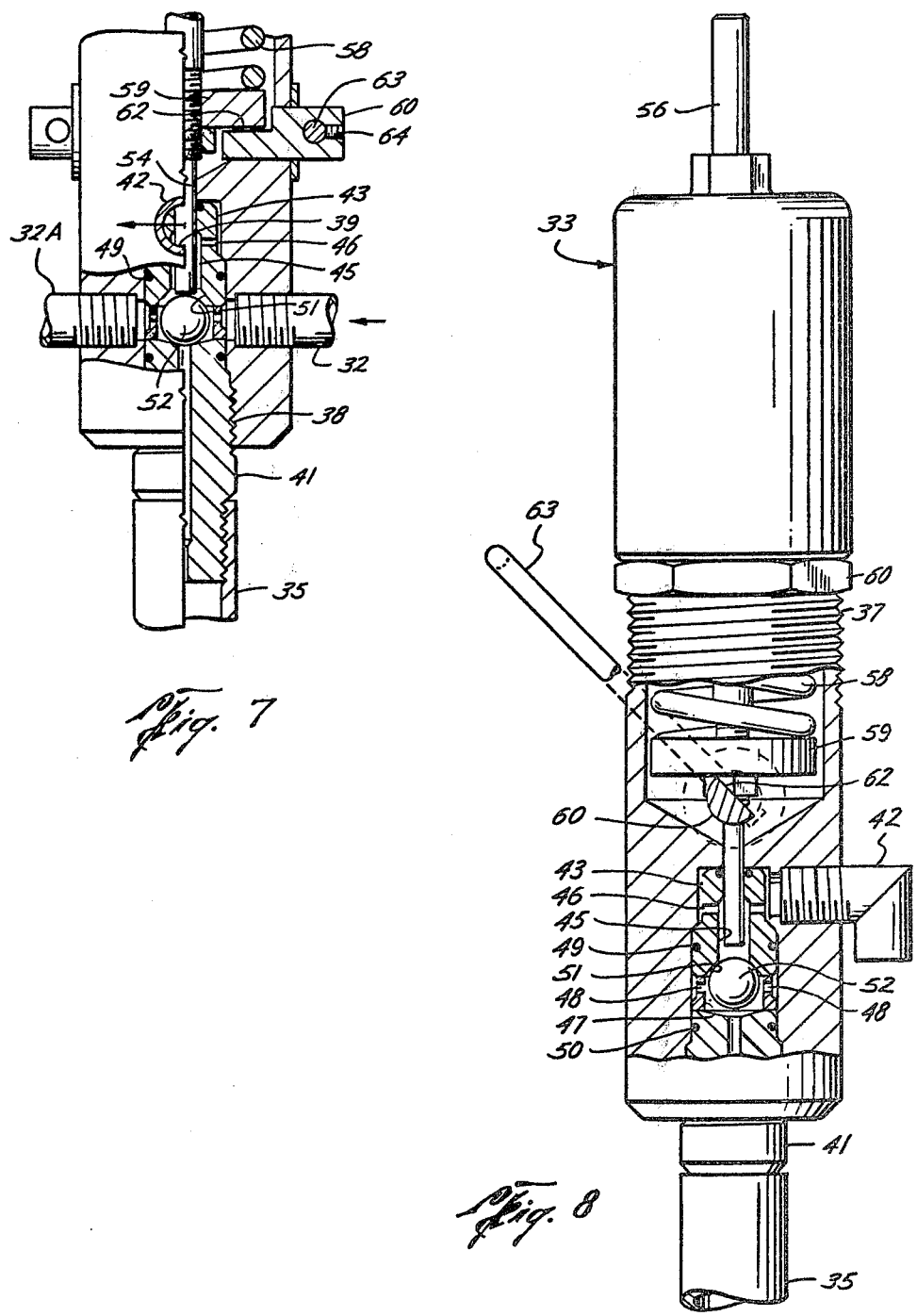

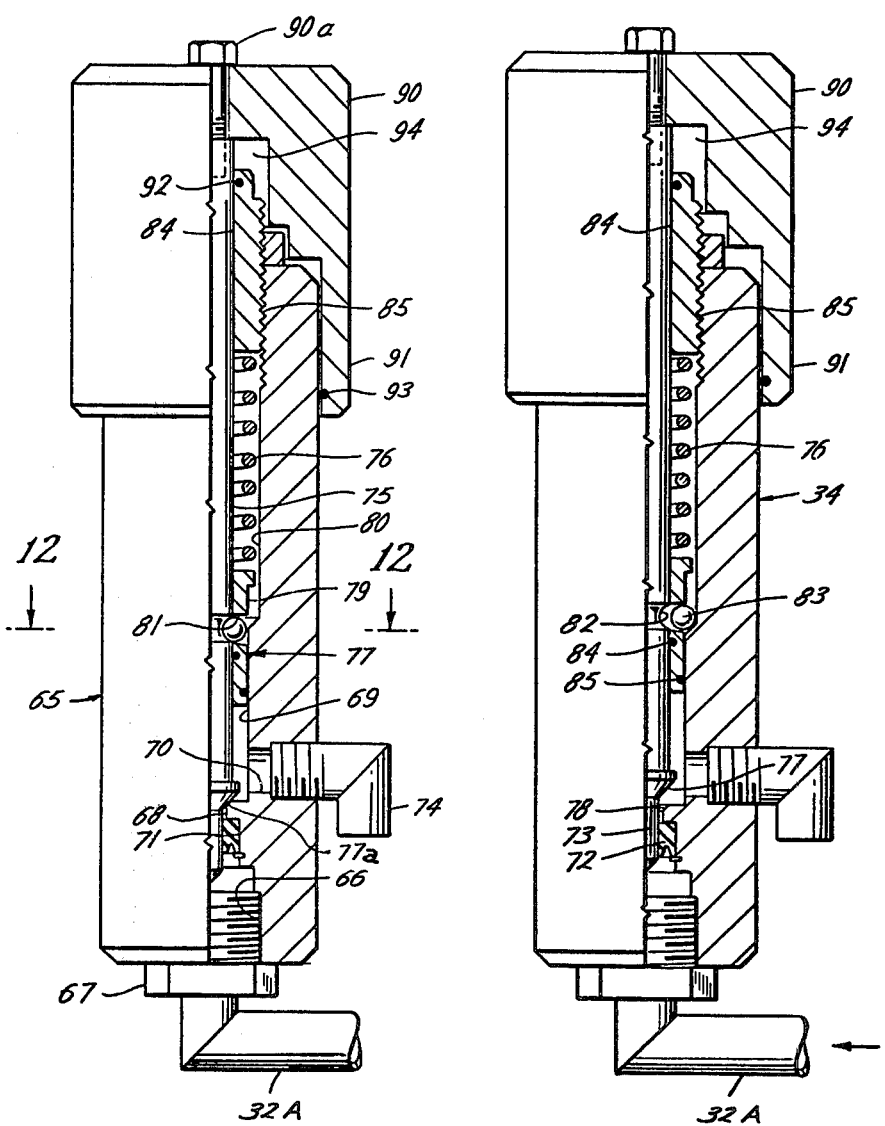

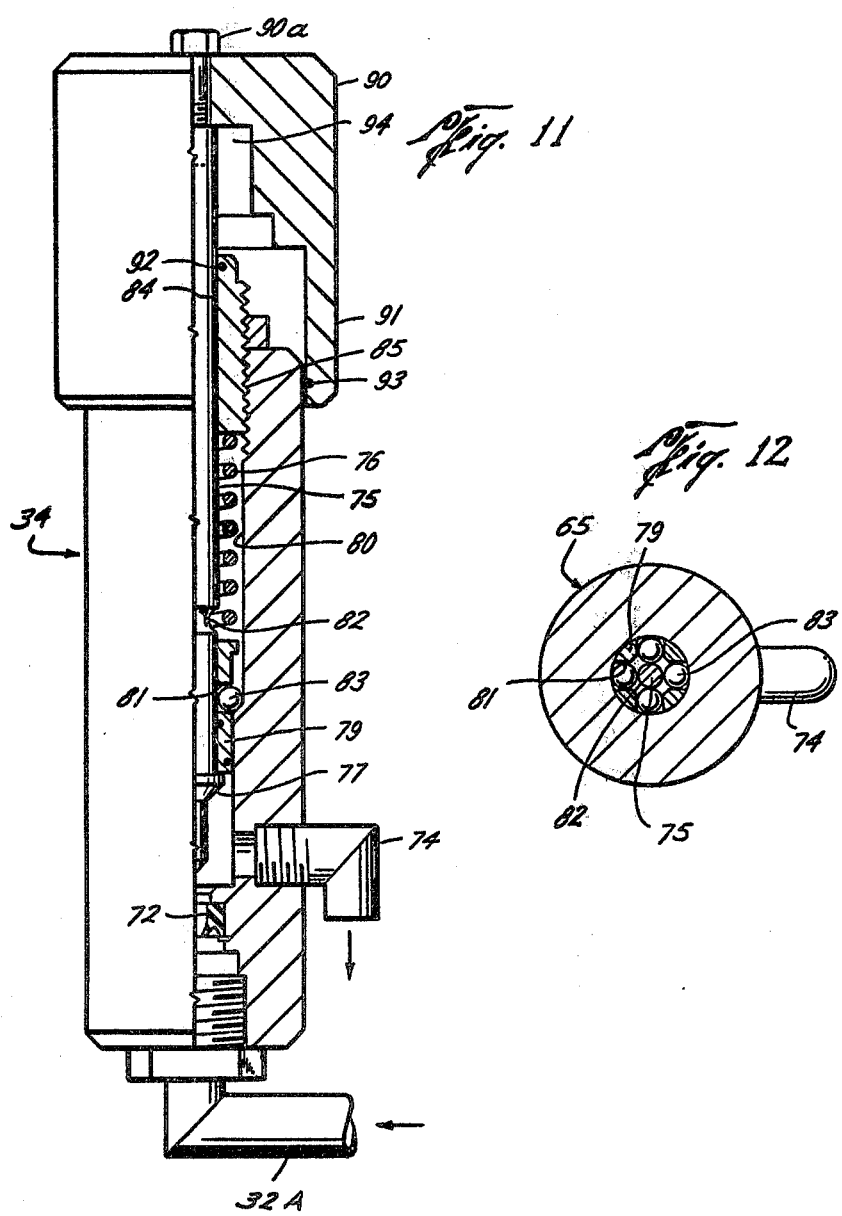

FLOW LINE CONTROL SYSTEM

This invention relates generally to a system for controlling flow through a line by means of a valve which is moved between flow-controlling positions by a fluid-operated actuator; and, more particularly, to improvements in such a system which controls the admission and exhaustion of line fluid to and from the actuator, and thus movement of the line valve, automatically in response to predetermined high and low pressures of the line fluid.

In systems of this type, the admission and exhaust of fluid to and from the actuator is controlled by a pair of sensors each connecting to the line and actuator, with one being operable to control the flow of fluid to and from the actuator in response to a predetermined low line pressure, and the other being operable to control the flow of fluid to and from the actuator in response to a predetermined high line pressure. Preferably, the fluid for operating the actuator is the line fluid to be controlled inasmuch as this eliminates the need for a separate source of operating fluid. Although I am aware of a prior system which is line pressure operated, it is of complex construction in that it requires, among other things, a velocity check valve for preventing the admission of line fluid to the sensors upon exhaustion of line pressure from the actuator.

Furthermore, in the event line fluid rises above the predetermined low pressure, the high pressure sensor of this prior system may chatter, and thus not remain open long enough to permit the velocity check valve to close. As a result, it's possible for the line pressure to bleed out the sensor without creating sufficient pressure drop to exhaust line fluid from the actuator sufficiently rapidly to move the line valve. Furthermore, although the low pressure sensor will remain open once tripped and can only be reset manually, so that the above-described problem will not occur in the event line fluid drops below the predetermined low pressure, additional manual manipulations are required to return the resetting mechanism to its original position, after resetting, thereby increasing the risk of its being left in resetting position, and thus preventing the sensor from tripping in response to the predetermined low pressure.

An object of this invention is to provide a system which is of less complex construction in that it does not require, among other things, a velocity check valve.

Another object is to provide such a system having a high pressure sensor which will remain in an open or tripped position until manually reset.

Another object is to provide such a system having a low pressure sensor which may be reset by a manually operable mechanism which will automatically return to its original position after resetting.

A still further object is to provide a system of the type described which is capable of accomplishing all of the foregoing objects.

These and other objects are accomplished, in accordance with the illustrated embodiment of the invention, by a system of the type described wherein the low pressure sensor has an inlet to its interior and a vent opening connecting with its interior, the high pressure sensor has an inlet to and a vent opening from its interior, means are provided for connecting the first sensor inlet to the line to be controlled and the interior of the low pressure sensor with each of the valve actuator and the inlet to the high pressure sensor. More particularly, the low pressure sensor also has valve means which is shiftable between a first position opening its inlet to admit line pressure to the actuator and the inlet to the second sensor while closing the connection of the first sensor interior with the vent opening therefrom, and a second position closing the inlet while opening the connection of the interior to the vent opening so as to exhaust line fluid from the interior of the low pressure sensor through its vent opening. The shiftable valve means of the low pressure sensor is yieldably urged toward its second position so that the valve means will be shifted from its first position to its second position when line pressure within the interior of the first sensor drops below a predetermined value.

The high pressure sensor also has valve means shiftable between positions opening and closing the inlet to the interior thereof and thus to the outlet from the interior, and a means is provided for yieldably urging such valve means to its closed position so that, as long as the shiftable valve means of the low pressure sensor is in its first position, the shiftable valve means of the second sensor will not shift to its open position to exhaust line fluid from its vent opening until the pressure of line fluid within the interior of the high pressure sensor has risen to a predetermined value. The drop of fluid pressure within the interior of the low pressure sensor to said predetermined value, which occurs due to opening of the shiftable valve means of the high pressure sensor, will then cause the shiftable valve means of the low pressure sensor to shift to its second position. As a result, line pressure is prevented from admission to the interior of the low pressure sensor, and thus prevented from being exhausted through the vent opening in the high pressure sensor, all without the need for a velocity check valve, as required in the above-described prior system for this purpose.

In the preferred and illustrated embodiment of the invention, there is a first seat about the intersection of the inlet with the interior of the low pressure sensor, and a second seat about the intersection of the connection of such interior to the vent opening, with the first seat being of considerably lesser area than the second seat, whereby line pressure is ordinarily incapable of automatically resetting the low pressure sensor, while, on the other hand, movement of the valve means of the low pressure sensor away from the relatively large area of the second seat, will cause it to be moved to its first seat with a snap action. A manually operable means for shifting the valve means of the low pressure sensor from its second to its first position is automatically returnable, upon release following resetting, to a position in which it is disposed for shifting such valve means back to its first or tripped position in response to the predetermined low pressure of the line fluid.

In the illustrated and preferred embodiment of the invention, the valve means of the high pressure sensor includes a valving element which is axially slidable within an annular sealing member in the inlet to the interior of the sensor body, and a detent means is provided which connects the yieldable urging means to the shiftable valve means thereof, such detent means including means for releasing the connection of the urging means to the valve means following initial movement of the valve means toward open position but prior to withdrawal of the valving element from the annular sealing member. In this manner, pressure is permitted to build up on the valve means in its closed position so as to insure its opening with a snap action, and thus prevent it from chattering due to intermittent opening and closing as the line fluid is incrementally exhausted. More particularly, manually operable means are provided for shifting the valve means of the high pressure sensor from its opened to its closed position, and the detent means includes means for automatically reconnecting the urging means to the valve means in response to this shifting of the valve means toward closed position.

In the drawings, wherein like reference characters are used throughout to designate like parts:

FIG. 1 is a side view, partly in section and partly in elevation, of a pipeline having a valve installed therein and a fluid-operated actuator installed on the valve for moving it between line opening and closing positions, together with a system constructed in accordance with the present invention for use in controlling the admission and exhaustion of line fluid to and from the actuator in response to predetermined high and low pressures of the line fluid;

FIGS. 1A and 1B are enlarged views, partly in section, of the lower ends of the low pressure sensor and high pressure sensor of such a system, with the ball of the low pressure sensor in its set or upper position and the valving element of the high pressure sensor in its closed position in order to admit line fluid to the actuator and thereby move it to its lower position for maintaining the valve in the open position of FIG. 1;

FIG. 2 is a view similar to FIG. 1, but with the line fluid exhausted from the upper end of the actuator and the line valve moved to line closing position;

FIGS. 2A and 2B are views of the low pressure pilot and high pressure relief valve, similar to those of FIGS. 1A and 1B, respectively, but with the ball of the low pressure tripped in response to a predetermined low pressure in the line to permit line fluid to be exhausted from the actuator through the vent port of the low pressure sensor to permit the valve to move upwardly to closed position, as shown in FIG. 2;

FIGS. 3A and 3B are views of the low pressure pilot valve and high pressure relief valve, similar to those of FIGS. 1A and 1B, respectively, but with the valving element of the high pressure sensor raised to open position in response to a predetermined high pressure in the line so as to exhaust line fluid from the actuator through the vent port in the high pressure sensor, and thereby permit the valve to be moved to the closed position of FIG. 2;

FIG. 4 is a side view of the low pressure sensor, partly in section and partly in elevation, with the ball thereof in its upper, set position;

FIG. 5 is a partly sectional view of the lower end of the low pressure sensor, as seen along broken line 5—5 of FIG. 4;

FIG. 6 is a cross-sectional view of the lower end of the low pressure sensor, as seen along broken line 6—6 of FIG. 4;

FIG. 7 is a partial sectional view of the lower end of the low pressure sensor, similar to that of FIG. 4, but with the ball thereof moved downwardly to its tripped position;

FIG. 8 is a side view of the side of the low pressure sensor, as seen in FIG. 5, but with the lower portion thereof broken away and with a handle thereon swung upwardly to rotate a pin in order to raise the stem and thereby permit the ball to reset;

FIG. 9 is a side view, partly in section, of the high pressure sensor, with the valving element thereof in closed position;

FIG. 10 is a view similar to FIG. 9, but with the valving element moved upwardly, in response to line fluid of predetermined high pressure, for a distance just sufficient to release the detents locking the compressed spring to the stem;

FIG. 11 is a further view similar to FIGS. 9 and 10, but upon movement of the valving element to its fully open position, and thus with its lower end withdrawn from the sealing member about the passageway of the inlet; and FIG. 12 is a cross-sectional view of the high pressure sensor, as seen along broken lines 12—12 of FIG. 9.

Figure 3A:
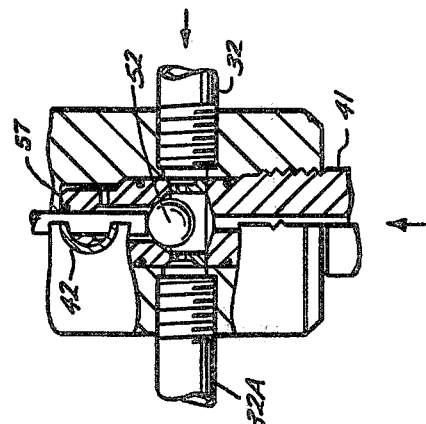
FIG. 3C is a view of the low pressure sensor upon dropping of the valve to its tripped position immediately following opening of the high pressure sensor so as to prevent loss of line fluid as the line valve is moved to the closed position of FIG. 2 upon continued exhaustion of line fluid from the actuator through the vent ports in the open high pressure sensor and tripped low pressure sensor.
Figure 3B:
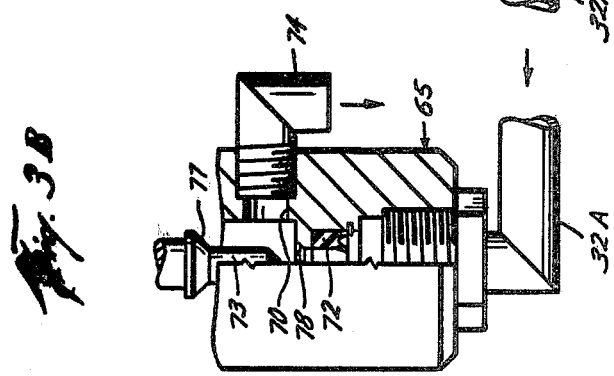
Figure 3C:
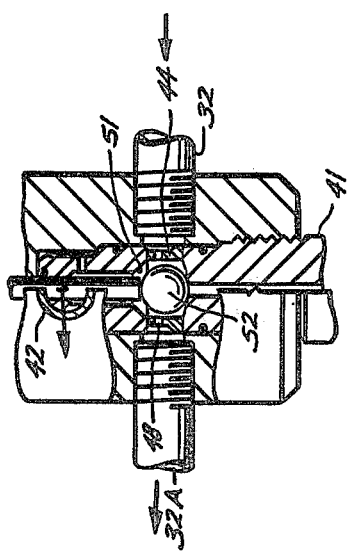

With reference now to the details of the above-described drawings, valve 20 shown in FIGS. 1 and 2 includes a body 22 having a flowway 23 connected in alignment with a pipeline 21, and a closure element 24 reciprocable within the valve body between the open position of FIG. 1 and the closed position of FIG. 2. The gate is of the through-conduit type having a hole 25 which is aligned with the flowway 23 in the open position of the valve, and which is raised to a position above the flowway to dispose a solid portion of the gate across the flowway in the closed position of the valve.

The closure element 24 is moved between its opened and closed positions by means of a stem 26 which extends sealably through an opening in a bonnet 28 on the valve body to permit it to be reciprocated by means of an actuator 27 installed upon the bonnet 28. The actuator includes a body providing a cylinder housing 29 and having an opening in its lower end aligned with the bonnet opening to receive the stem 26 therethrough. A piston 30 connected to stem 26 is sealably slidable within the cylinder between an upper position to raise the valve to its closed position, as shown in FIG. 2, and a lower position to lower the valve to its open position, as shown in FIG. 1.

Piston 30 is urged to its upper position by means of a coil spring 31 disposed between it and the lower end of housing 29, and is urged to its lower position by means of line fluid which is admitted thereto through conduit 32 connecting with the upper end of housing 29. As will be described in detail to follow, when line fluid is admitted through conduit 32 to the upper end of piston 30, it forces the piston downwardly against the force of spring 31 so as to open the valve. However, upon exhaustion of line fluid through conduit 32 from the actuator above piston 30, the piston is permitted to move upwardly so as to lift the valve 24 to its closed position. This alternate admission and exhaustion of line fluid to and from the actuator is controlled by means of the system which includes a low pressure sensor 33, a high pressure sensor 34, a conduit 35 connecting flowway 23 with an inlet port to the low pressure sensor, and a conduit 32A connecting a port in the low pressure sensor with an inlet port to the high pressure sensor.

In the system illustrated, wherein the line valve moves to closed position in response to a predetermined high or low line pressure, flow is from left to right in FIGS. 1 and 2. As will be better understood from the description to follow, this assures sufficient buildup in line pressure following tripping of the low pressure sensor to permit it to be reset.

The low pressure sensor 33 is best shown in FIGS. 4 to 8 to comprise a pilot valve having body 37 including a lower portion having an interior which connects with inlet port 38 at its lower end, a vent port 39 near its upper end, and ports 40 and 40A in opposite sides of a portion thereof intermediate the inlet port 38 and vent port 39. Conduit 35 connecting with the flowway 23 is threadedly connected to inlet port 38 by means of a nipple 41, and a downwardly turned vent pipe 42 is threadedly connected to the vent port 39. Conduit 32 connecting with the actuator is threadedly connected with side port 40, and conduit 32A connecting with the high pressure sensor 34 is threadedly connected with side port 40A.

The interior of the lower portion of the body is formed by a bore which extends upwardly from inlet 38, and tubular inserts 43 and 44 are received closely in the bore and held in place by the upper end of nipple 41. The upper insert 43 has a vertical passageway 45 therethrough and side ports 46 connecting the passageway with an annular space about the insert, and thus with the vent pipe 42. The lower insert 44 has an enlarged inner diameter which provides a chamber 47 connecting the hole through the upper end of nipple 41 with passageway 45, and side ports 48 which connect the chamber with an annular space thereabout, and thus with chamber 47 and each of the conduits 32 and 32A connecting with ports 40 and 40A, respectively. Seal ring 49 is carried about outer diameter of upper inser 43, and seal ring 50 is carried by the outer diameter of the upper end of nipple 41, each for sealing with the bored interior of the lower portion of the body to prevent the loss of fluid from the chamber. Additionally, the lower end of the body is counterbored to provide seats 49A and 50A against which shoulders on insert 43 and nipple 41 are engaged to provide metal-to-metal seals which back up the seals provided by seal rings 49 and 50.

The lower end of passageway 45 is conically shaped at its intersection with the chamber 47, and the upper end of nipple 41 is conically shaped at its intersection therewith, but to a much smaller angle with respect to the horizontal. A ball 52 is vertically shiftable within the chamber 47 between an upper position seated on a seat 51 about the upper conical surface so as to prevent the flow of line fluid within the chamber into the passageway 45 and thus out the vent tube 42, and a lower position in which it seats upon a lower seat defined by the upper end of the opening through nipple 41 as to prevent the admission of line fluid into chamber 47. In both its upper and lower seated positions, as well as in all positions intermediate thereof, the sides of the ball are spaced from the sides of the passageway 47 so as to permit fluid to flow between the inlet and each of the conduits 32 and 32A when the ball is in its upper or set position, and between the passageway 45 and each of the conduits 32 and 32A when the ball is in its lower seated or tripped position.

The body also includes an upper tubular portion 52a which extends upwardly from the lower body portion in coaxial relation with the passageway 45, and a cap 53 threadedly connected to the upper end of portion 52a so as to close same. The upper end of passageway 45 is connected to the lower end of the tubular extension by an opening 54, and a hole 55 is formed in the upper end of the cap coaxially of opening 54. A rod 56 extends into the hole 55 within the cap 53, through the tubular extension 52a, and into the opening 54 for engagement at its lower end with the upper end of ball 52. A seal ring 56a is carried within hole 55 for preventing dust and other debris from entering the tubular extension, and a seal ring 57 is carried by the upper inner corner of upper insert 43 about passageway 45 so as to seal about the rod 56 and between the insert and lower body portion in order to contain fluid within the passageway.

The rod 56 is urged in a downward direction and thus toward the ball by means of a coil spring 58 within tubular extension 52a which bears at its upper end on cap 53 and at its lower end upon a flange 59 threaded about an intermediate portion of the rod 56. This of course provides a force which yieldably urges the rod downwardly and thus the ball 52 from its upper seated position toward its lower seated position. The amount of this force is adjustable by means of the threaded connection of the cap to the tubular extension 52a—e.g., a lock nut 60 may be backed off of the low end of the cap 53 to permit it to be moved downwardly thus increasing the compression of spring 58.

When in its upper seated or set position, the ball is acted upon by an upwardly directed force equal to the pressure of line fluid within chamber 47 times the area of the seat 51 formed on the conical surface at the lower end of sleeve 43. This upwardly directed force is in turn opposed by the force due to the spring 58, so that as long as the line pressure is above a predetermined minimum value, the ball will remain in its set or upper position. In this set position of the ball, line fluid is admitted through the inlet to each of the conduits 32 and 32A. Line fluid flowing through conduit 32 is of course admitted to the upper end of piston 30 to hold the actuator in its downward position and thus maintain the line valve open.

However, in the event pressure within the chamber 47 drops below this predetermined minimum, as might occur in the event of a break in the line 21, the ball will be forced from its upper seat. Due to the relatively large area over which the ball seats in its upper position, it will, as soon as it is unseated, be moved rapidly downwardly to its lower seated position with a snap action due to the force of spring 58. At this time, fluid within the actuator above piston 30 is exhausted through line 32, chamber 47 and passageway 45 out through vent tube 42, so as to permit the actuator piston to move upwardly to close the gate. Of course, fluid is also vented from conduit 36 leading to the high pressure sensor 34, although, as will be described, the effect of that is unimportant since sensor 34 is closed.

When ball 52 is in its lower tripped position, it is seated upon a relatively small area defined by the diameter of the hole through nipple 41 intersecting with chamber 47. Thus, under normal operating conditions, the pressure of the fluid within the line 21 is not sufficient to overcome the force of the spring 58, even though line fluid has been exhausted from chamber 47 through vent pipe 42. Thus, in a manner to be described to follow, it is necessary to manually reset the pilot valve 33 when it is to be put back in use.

Furthermore, even if the pressure of line fluid should be large enough to unseat the tripped ball 52, this would only be momentary, since upon being unseated, the ball would permit additional line fluid to be exhausted, thus reducing the force tending to lift it and permitting the spring to move it back to tripped position. As a matter of fact, this need for resetting the ball manually is desirable from the standpoint of the user of this equipment, since for example it permits him to inspect the line or other reason for the drop in line pressure which caused the ball to trip, before this system is put back into service.

The ball is so reset by means of pins 60 rotatably mounted within holes 61 formed in opposite sides of the pilot valve body 37 at approximately the joinder of the lower portion of the body and the tubular extension thereof. More particularly, each such pin has a flat cam surface 62 formed on its inner end which is disposed beneath the lower side of spring retainer flange 59 in the elevated position which stem 56 occupies when the ball is lifted to its set position, as best shown in FIG. 4. When the ball is to be reset, pins 60 are rotated to the position shown in FIG. 8, to raise the cam surface 62 against flange 59 to lift the lower end of the stem above the position it occupies in the reset position of the valve, as shown in FIG. 4.

With the pins held in this position, line pressure is sufficient to lift the ball from its tripped position to its set position, since the only force which would oppose the lifting force to the line pressure, even assuming the valve is in the vertical position shown in the drawings, is the weight of the ball. Furthermore, once the ball is lifted, the flow of line fluid about the ball within the chamber 47 and into passageway 45 for exhausting through vent pipe 42 will actually draw the ball upwardly to the seated position of FIG. 8. Upon return of the pins 60 to the positions of FIGS. 4 and 6 the spring may expand to permit the lower end of the stem to be moved back into engagement with the reset ball. As long as line pressure now acting over the area of seat 51 is above the predetermined low, it provides a force which is greater than that of the spring so that the ball remains reset until line pressure drops below the predetermined low.

As shown, the pins are swung between these alternate positions by means of a "U"-shaped handle 63 having its ends secured in holes through the outer ends of pins 60 by means of set screws 64. In the inactive position of the pins 60, the handle 63 is in a position generally transverse to the length of the valve body, and thus horizontal in the event the valve body extends vertically. As shown in FIG. 8, only about 45° of rotation of the pins is required to lift the stem the required distance, so that the loop avoids interference with the pilot valve body in this position as well.

Since less than 90° of rotation of the pins is required, they are constantly urged from the position of FIG. 8 back to the position of FIG. 4 by the force of the spring 58. Consequently, the user of equipment need only release the handle 63 upon permitting the ball to reset, regardless of the disposition of the sensor body with respect to the horizontal. Furthermore, since the cam surfaces 62 will remain relatively close to the lower side of the flange 59 in the inactive position of FIG. 4, the pins are prevented from rotating to any significant extent out of their inactive positions, again regardless of the disposition of the sensor body with respect to the horizontal.

In using this equipment, the operator will hold the handle in the position of FIG. 8 until sufficient line fluid has entered chamber 47 and passed through conduit 32 in order to lower the piston 30 and thus move the line valve to opened position. This, of course, can be observed by the downward movement of the upper end of the stem 26 which projects from the upper end of cylinder housing 29.

The ball will remain in its reset position until there has been a drop in the pressure of the line fluid below the predetermined minimum, or until the high pressure relief valve has been caused to open, as will be described to follow, or unless there are other malfunctions of the equipment, such as the loss of pressure in the actuator above the piston 30. Alternatively, the ball may be tripped due to loss of pressure in chamber 47 resulting form a remote control device (not shown) connected to the chamber through another port (not shown) in the valve body. Still further, the automatic tripping mechanism may be overridden and the ball 52 moved to its tripped position manually by depression of the upper end of the stem 56 which extends through the hole 55 in the upper end of cap 53.

The high pressure sensor 34 which is shown in its entirety in FIGS. 9 to 11, comprises a body 65 having a bore therein and an inlet port 66 connecting with the lower end of the interior of the body provided by the bore. More particularly, the port has a lower enlarged end which is threaded to receive a nipple 67 for connection with conduit 32A connecting with the chamber 47 of the low pressure sensor. The upper end of the inlet is reduced to provide a passageway 68 connecting with a chamber 69 in the lower end of the interior of the valve body, and thus with an outlet 70 from the chamber to which vent pipe 74 is connected.

One problem which is frequently encountered in the use of prior sensors of this general type is the tendency of the valving element to chatter—i.e., to open only momentarily to exhaust the high pressure fluid. This would be especially harmful in the illustrated system since it might not be possible to obtain a sufficient drop in pressure in the chamber 47 of the low pressure pilot to cause the ball 52 to trip. If the ball does not trip, line fluid within the actuator does not exhaust through conduit 32 and passageway 45 out the vent tube 42. Thus, instead of causing the line valve to close in response to this predetermined high pressure, it would instead be permitted to bleed out through the intermittent opening of the relief valve.

This problem is overcome, in accordance with the present invention, by a novel construction which includes an inlet port which is counterbored to receive an annular sealing member 72 whose inner diameter forms a portion of the passageway 68 leading to chamber 69. The passageway is opened and closed by means of an elongate, cylindrically shaped valve element 73 which, in the closed position shown in FIG. 9, is received closely within the sealing member 72, and in the open position, is moved upwardly out of the sealing member, as shown in FIG. 11. When the passageway is open, line fluid may flow through the inlet 66 and chamber 69 out the vent tube 74 so as to exhaust chamber 47, and thus upper end of piston 30 of the actuator to permit closing of the line valve in response to line pressure of a predetermined high value, as will be described fully hereinafter.

As will be appreciated, the pilot valve is urged from its closed to its open position by a force due to line pressure acting upwardly over the cross-sectional area of that portion of the valving element received within sealing member 72. As will be described to follow, this force tending to open the valve is opposed by spring pressure which is so adjusted as to permit the valve to open only in response to fluid pressure beneath the valving element of a predetermined high value. More particularly, sensor 34 opens with a snap action, and remains in that open position until manually reset.

For this purpose, valving element 73 is mounted on the lower end of a stem 75 which extends upwardly within the bore through the valve body, and a coil spring 76 received within an annular space between the stem and the bore is releasably locked to the stem by detent mechanism 77 to hold the valving element 73 in its closed position until line pressure beneath the valve element reaches a predetermined high.

As best shown in FIG. 9, the spring 76 will maintain the lower enlarged end 77a of the stem engaged with a seat 78 about the intersection of the passageway with chamber 69. In this position, the lower cylindrical end of the valving element 73 projects downwardly from the lower end of annular sealing member 72. The sealing member is of the "U"-shaped type having lips on the lower ends of its inner and outer diameters, which, in an uncompressed state, flare inwardly and outwardly, respectively. Thus, with the valving element in its closed position of FIG. 9, fluid pressure within the inlet 66 will urge the lips into tight sealing engagement with the valving element and with the counterbored portion 71 of the valve body.

More particularly, the valving element is of such length that its lower cylindrical end will remain beneath the lower end of the inner lip on sealing member 72 until the detent mechanism 77 releases the connection of spring 76 to stem 75. Consequently, pressure within the inlet 66 is permitted to build up before the spring pressure is released, so that, upon release of the spring pressure, valving element 73 will move upwardly to the position of FIG. 11 with a snap action.

The detent mechanism 77 includes a sleeve 79 whose lower end is closely received within a reduced diameter portion of the bore above chamber 69 and beneath the enlarged diameter portion 80 thereof forming the space in which the spring 76 is retained. The sleeve 79 is vertically reciprocable within the bore and has radial holes 81 formed therein to receive balls 83 which shift therein between locked and unlocked positions with respect to the stem 75. More particularly, a groove 82 is formed about the stem to receive the inner sides of the balls when the outer sides of the balls are opposite the reduced diameter of the bore and thus held thereby in locking position within the groove 82. In this way, the force of the spring 76, which bears at its lower end upon the upper end of sleeve 79, and is held down at its upper end by means of nut 84 threadedly connected at 85 to the upper end of the bore, is transmitted through the detent mechanism to the stem for normally holding valve element 73 in its closed position of FIG. 9.

However, upon upward movement of the valve element, and thus the stem 75, under the influence of line pressure of a predetermined high value, the balls are carried by the stem into a position which they are opposite the enlarged diameter spring space. More particularly, and as previously described, just prior to movement of the lower end of the cylindrical portion of the valving element above the inner sealing lip of sealing member 72, the balls 83 will be moved out of stem groove 82 and into the spring space, thereby releasing the stem and thus the valving element for upward movement with a snap action. Thus, O-rings 84 and 85 are carried on the inner and outer diameters of sleeve 79 so that line pressure initially released, upon opening of the valve element, will initially act over the lower end of such element and the sleeve 79.

The depth of groove 82 is less than the radius of the balls 83 so that the upwardly moving stem will force the balls out of the groove and into the spring space, as shown in FIG. 10. Upon release from the detent mechanism, the stem moves upwardly to a position determined by the engagement of its enlarged lower end 77a with the lower end of the sleeve, the spring 76 will act as a shock absorber between the stem and the valve body in which it moves.

Upon opening of the relief valve, line fluid is of course exhausted from the chamber 47 of the low pressure sensor out through vent tube 74. Although this exhaustion of line fluid from chamber 69 of sensor 34 dissipates the force otherwise urging the stem upwardly, the stem is held in its upper position, until manually reset in a manner to be described, by the frictional engagement of the inner sides of the detent balls 83 with the stem intermediate its enlarged end 77a and the recess 82. Thus, enlarged diameter 80 of the bore is larger than the reduced diameter thereof by only an amount approximately equal to the depth of the recess 82, so that, in the position shown in FIG. 11, the inner sides of the balls 83 are held against the stem due to the force of the spring acting through the sleeve to urge the balls downwardly along the conical surface at the lower end of the spring space.

As previously described, since the relief valve remains open until manually reset, there is no reason for the ball 52 not to remain in tripped position, to permit full exhaustion of the line valve actuator, and further prevent the bleed of line pressure out the vent from the sensor 34. That is, since the lower pressure sensor remains open, there is no danger that the ball will be prevented from fully seating due to chattering of the valving element of the low pressure sensor, as might occur in prior valves of this type.

The upper end of stem 75 extends guidably through the nut 84 on the upper end of body 65 of the relief valve to provide a part which may be depressed in order to manually reset the relief valve—i.e., return the valving element 73 to the position shown in FIG. 9. More particularly, a cap 90 is connected by a bolt 90a to the upper end of the stem, and has a skirt 91 which is disposed about the upper end of valve body 65 during reciprocation of the cap 90 with the stem between the positions of FIG. 9 and 11. An O-ring 92 is carried by the nut 84 to form a sliding seal about the stem and an O-ring 93 is carried by the inner surface of the skirt to form a sliding seal about the upper end of body 65. These O-rings thus enclose a space 94 within the cap and on the upper end of the valve body, which space increases in volume as the stem moves upwardly from the closed position of the valving element to its open position of FIG. 11. This will at least momentarily create a vacuum during raising of the cap with the stem, and the vacuum will in turn further absorb shock due to the rapid upward movement of the stem. On the other hand, there will be slow leakage of fluid through the threaded connection 85 so as to prevent a vapor lock when the cap is depressed with the stem in order to manually reset the relief valve.

Upon depression of the cap 90 connected to stem 75 to return the valving element to closed position within the sleeve 72, the entire system can be reset by resetting the low pressure sensor. As previously described, this merely requires manipulation of the handle 63 to position of FIG. 8 to lift the lower end of the stem 56 from the tripped ball so that it may be lifted to its upper seated or set position in response to the line fluid pressure. When the line fluid thus admitted by the actuator has returned the line valve to open position, the handle may be released to permit it to move back to the position of FIG. 6. Assuming that line pressure has built up above the predetermined minimum, the ball 52 will then remain in its set position until subsequently tripped for any of the reasons previously described.

For example, and to summarize, in the event that line pressure drops below a predetermined low, ball 52 of the low pressure sensor will move away from its upper seat, and then be moved with a snap action to its lower seated position. In this latter position, conduit 32 conencts with passageway 45 of the low pressure sensor to permit line fluid to be exhausted from the actuator through vent tube 42, which in turn permits the line valve to move upwardly to the closed position of FIG. 2.

The low pressure sensor will remain in its tripped position until it is reset manually, in the manner previously mentioned. Upon resetting, of course, the line pressure is again admitted through the inlet to the low pressure sensor, and conduit 32 into the actuator above piston 30 to return the valve to the open position of FIG. 1.

In the event line pressure rises above the predetermined high, the valving element 73 of the high pressure sensor is moved upwardly against the force of the spring 76 and gradually withdrawn from within the annular sealing member 72. At such time that the valving element reaches the elevation shown in FIG. 10, and while its lower end is still beneath the inner sealing lip on the annular sealing member 72, the detent balls 83 are moved outwardly from locking engagement within recess 82 in the stem 75 so as to release the stem from the spring, and thus permit the stem and valving element to be moved upwardly with a snap action to the position of FIG. 11. This delay in opening of the passageway due to the gradual withdrawal of the valving element from the annular sealing member insures sufficient buildup of pressure within the inlet beneath the valving element to insure continued upward movement of the valving element after its connection with the spring has been released.

Opening of the high pressure sensor will, of course, permit line fluid to be exhausted from the actuator through conduit 32, chamber 47 of the low pressure sensor, and conduit 32A out the vent tube 74 of the high pressure sensor. Due to venting of line fluid from chamber 45, ball 52 of the low pressure sensor moves rapidly downwardly to its tripped position, just as if the drop in pressure in chamber 45 had been due to a drop in line pressure below the predetermined minimum. Consequently, line pressure is prevented from bleeding out the exhaust of either sensor.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a system wherein flow through a line is controlled by a valve which is moved between flow controlling positions by a fluid-operated actuator, apparatus comprising a first sensor having an inlet to the interior thereof and a vent opening connecting with the interior, a second sensor having an inlet to and a vent opening from the interior thereof, means connecting the first sensor inlet to the line, means connecting the interior of the first sensor with each of the inlet to the actuator and the inlet to the second sensor, said first sensor also having valve means shiftable between a first position opening the inlet thereof to admit line fluid to the actuator and to the inlet to the second sensor while closing the connection of the first sensor interior with the vent opening therefrom, and a second position closing the said inlet while opening the connection of the interior to the vent opening so as to exhaust line fluid from said interior through said vent opening, and means yieldably urging the shiftable valve means toward its second position so that said valve means will be shifted from its first to its second position when line pressure within the interior of the first sensor drops below a predetermined value, and said second sensor also having valve means shiftable between positions opening and closing the inlet to the interior thereof, and means yieldably urging said shiftable valve means to its closed position so that, as long as said shiftable valve means of the first sensor is in its first position, said shiftable valve means of the second sensor will not shift to its open position to exhaust line fluid through the vent opening thereof until the pressure of line fluid within the interior of the second sensor has risen to a predetermined value, the drop of fluid pressure within the interior of the first sensor to said predetermined value, due to opening of the shiftable valve means of the second sensor, causing said shiftable valve means of the first sensor to shift to its second position.

2. Apparatus of the character defined in claim 1, wherein there is a first seat about the intersection of the inlet wtih the interior of the first sensor, and a second seat about the intersection with the interior of the connection of said interior to the vent opening, said first seat being of considerably lesser area than the second seat.

3. Apparatus of the character defined in claim 1, including means including a manually operable part for shifting the valve means of the first sensor from its second to its first position, said last-mentioned means being automatically returnable, upon release of said part, to a position for subsequently shifting said valve means to the first position.

4. Apparatus of the character defined in claim 1, wherein the valve means of the second sensor includes a valving element which is axially slidable within an annular sealing member in the inlet to the interior of said second sensor, and said second sensor also includes detent means connecting said yieldable urging means to the shiftable valve means thereof, said detent means includes means for releasing the connection of said urging means to said valve means only following initial movement of said valve means toward open position but prior to withdrawal of the valving element from within the annular sealing member.

5. Apparatus of the character defined in claim 2, wherein the valve means of the second sensor includes a valving element which is axially slidable within an annular sealing member in the inlet to the interior of said second sensor, and said second sensor also includes detent means connecting said yieldably urging means to the shiftable valve means thereof, and said detent means includes means for releasing the connection of said urging means to said valve means only following initial movement of said valve means toward open position but prior to withdrawal of the valving element from within the annular sealing member.

6. Apparatus of the character defined in claim 4, including manually operable means for shifting the valve means of the second sensor from its open to its closed position, said detent means including means for automatically reconnecting the urging means to the valve means as the valve means is shifted to its closed position.

7. Apparatus of the character defined in claim 5, including means including a manually operable port for shifting the valve means of the first sensor from its second to its first position, said last-mentioned means being automatically returnable, upon release of said part, to a position for subsequently shifting said valve means to the first position.

8. Apparatus of the character defined in claim 2, wherein said first sensor comprises a body having an interior including a chamber to which the actuator and the second sensor inlet are connected, the connection of the interior to the vent opening comprises a passageway leading from the second seat to the vent opening, and said valve means comprises a ball shiftable between first and second positions seated on the first and second seats, respectively.

9. Apparatus of the character defined in claim 4, wherein the annular sealing member has a lip adjacent its inner diameter and on its end remote from the interior, the valve element is slidably reciprocable within the sealing member between a closed position in which its end extends through and beyond the lip of the sealing member and an open position in which its end is removed from within the sleeve, said yieldable urging means comprising a spring-pressed stem on the valve element, and said detent means is disposed about the stem to provide a connection between the stem and spring which maintains the spring in a compressed condition so as to oppose opening movement of the valve element, said connection being releasable before the valve element has moved toward its open position a distance sufficient to withdraw its end from the lip of the sealing member, whereby further opening movement of said valve element is unopposed by the spring.

* * * * *